(12) United States Patent
Bickmore et al.

(10) Patent No.: US 6,466,213 B2
(45) Date of Patent: Oct. 15, 2002

(54) METHOD AND APPARATUS FOR CREATING PERSONAL AUTONOMOUS AVATARS

(75) Inventors: Timothy W. Bickmore, Sacramento, CA (US); Joseph W. Sullivan, Palo Alto, CA (US); Elizabeth F. Churchill, Mountain View, CA (US); Sara A. Bly, Hillsboro, OR (US); Linda K. Cook, Sacramento, CA (US)

(73) Assignee: Xerox Corporation, Stamford, CT (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 30 days.

(21) Appl. No.: 09/023,567

(22) Filed: Feb. 13, 1998

(65) Prior Publication Data

US 2001/0019330 A1 Sep. 6, 2001

(51) Int. Cl.[7] .................................................. G06F 15/00
(52) U.S. Cl. ....................................................... 345/473
(58) Field of Search ................................. 345/473, 474, 345/475, 719, 720

(56) References Cited

U.S. PATENT DOCUMENTS

| | | | |
|---|---|---|---|
| 5,563,988 A | | 10/1996 | Maes et al. .................. 395/121 |
| 5,790,124 A | * | 8/1998 | Fisher et al. ................. 345/473 |
| 5,880,731 A | * | 3/1999 | Liles et al. ................... 345/473 |
| 6,011,562 A | * | 1/2000 | Gagne et al. ................ 345/473 |

OTHER PUBLICATIONS

Andre, Elisabeth et al. "The PPP Persona: A Multipurpose Animated Presentation Agent." German Research Center for Artificial Intelligence, Germany, 1996.
Cassell, Justine et al. "Animated Conversation: Rule–based Generation of Facial Expression, Gesture & Spoken Intonation for Multiple Conversational Agents." Department of Computer & Information Science, Univ. of Pennsylvania, 1996.
Noma, Tsukasa et al. "A Virtual Human Presenter." Dept. of Artificial Intelligence, Kyushu Institute of Technology and Center for Human Modeling and Simulation, University of Pennsylvania, 1995.
Zellweger, Polle T. "Active Paths Through Multimedia Documents." Cambridge University Press, 1988.
Thorisson, Kristinn R. "ToonFace: A System for Creating and Animating Interactive Cartoon Faces." Learning and Common Sense Section Technical Report, Apr. 1996.

* cited by examiner

Primary Examiner—Phu K. Nguyen
(74) Attorney, Agent, or Firm—Oliff & Berridge, PLC

(57) ABSTRACT

A method and apparatus for facilitating communication about a document between two users creates autonomous, animated computer characters, or avatars, which are then attached to the document under discussion. The avatar is created by one user, who need not be the author of the document, and is attached to the document to represent a point of view. The avatar represents the physical likeness of its creator. The avatar is animated, using an avatar scripting language, to perform specified behaviors including pointing, walking and changing facial expressions. The avatar includes audio files that are synchronized with movement of the avatar's mouth to provide an audio message.

19 Claims, 15 Drawing Sheets

Microfiche Appendix Included
(1 Microfiche, 42 Pages)

500

AVATAR Tim "tim.avt" ⸺510

SCRIPT HELLO ⸺521
    1 for 5 : POSE FPOSE.rightArmUp
    1        : AUDIO HELLO
    20 for 5: POSE FPOSE.rightArmDown
ENDSCRIPT

FIG 9

METHOD AND APPARATUS FOR CREATING PERSONAL AUTONOMOUS AVATARS

This application contains one microfiche appendix (Appendix A) containing 42 frames.

BACKGROUND OF THE INVENTION

1. Field of Invention

This invention relates to creating personal autonomous avatars. In particular, the invention relates to a method and an apparatus for creating autonomous personal avatars that are attached to an electronic document.

2. Description of Related Art

Modem electronic documents, even those with hypertext capabilities, are often inferior to face-to-face communications in terms of succinctly conveying information among the author of the document and one or more readers. For example, many pages of detailed information may be required to convey a single idea that in face-to-face scenarios could be conveyed in minutes. This occurs because current electronic documents do not provide the multiple communication channels used by humans, including speech, facial expressions, gestures and speech annotation. Synthetic computer characters, such as two-dimensional animated graphical representations of humans, may be used to help remedy the disparity between the expressiveness of current electronic documents and that of human presenters. Such characters may be used by having the synthetic characters assume the metaphor of human-to-human conversation as a user interface mechanism. Current synthetic character systems fall into two broad categories: "directed characters" and "autonomous agent characters". Directed characters are those that are under direct and continuous user control. Examples include the various graphical chat-room environments on the Internet and motion picture and television studios specializing in motion-capture generation of cartoon characters. Autonomous agent characters are those that can act and react under their own control. That is, autonomous agent characters are not under direct control of a person. Instead, they are pre-programmed to function as a user interface to a software system.

Current systems using autonomous agent characters include Microsoft Agent ("Introduction to Microsoft Agent," at http://www.microsoft.com/workshop/prog/agent"). Microsoft Agent provides a very general agent server that allows client programs to launch and control animated characters that can be commanded to execute a named animation sequence, speak a text string, move and resize. JackPresenter ("A Virtual Human Presenter," Tsuhara Noma and Norman I. Badler, IJCAI, 1997) provides an anthropomorphically-correct, three-dimensional animated human that presents specific material. The PPP Persona Project ("The PPP Persona: a Multipurpose Animated Presentation Agent," Elizabeth Andre, Jochen Muller and Thomas Rist, Advance Visual Interfaces, ACM Press, 1997) uses a planning system to plan tutorial presentations as specified material given over a target time duration for the presentation. The PPP Persona system simply plans and executes a single presentation and does not support reader annotation of the document.

Another type of synthetic character is the autonomous personal representative. One role that an autonomous personal representative can perform is giving opinions of, or guided tours through, documents. The Active Task Project ("Active Task Through Multimedia Documents," Polle T. Zellweger, Cambridge University Press, 1988) provides the ability to script presentations of documents or sets of documents but does not use synthetic characters in the interface.

SUMMARY OF THE INVENTION

While the above-described systems may improve the quality of communications with respect to electronic documents, they lack the capability to personalize the virtual agent. Furthermore, they do not provide tight coupling between the personal representatives and the objects within the documents.

Accordingly, this invention provides a method and system for creating autonomous personal representatives, or avatars, that can be attached to an electronic document.

The avatars are bound to documents using a mechanism that specifies, for any object on a page of the document (e.g., word, sentence, paragraph), a narrative that a given avatar can deliver regarding the annotated object, together with a reference to the definitions of the avatar and its behaviors. The avatars are initially displayed in a margin of the document until a reader interacts with the avatars by selecting them, dragging them onto the document or selecting part of the document which has one or more avatars associated with it.

The avatars change their behavior based on the reader's actions and their current context within the document. For example, dragging the avatar over an annotated object on the document can cause the avatar to smile and raise its eyebrows. Each element of the avatar's behavior (e.g., a narrative or elaboration of part of the document) can include synchronized animations and audio. The avatars can also interact with the document itself by, for example, selecting hypertext links in the document pages. This gives the avatars the ability to provide customized presentations, or "guided tours" of documents. The adaptive multi-modal, i.e., text, audio, and animation, presentation capability provided by the avatars has a number of enhancement features, including increasing the amount of information stored within a document, by offering extra information when the avatar is invoked. Thus, the avatars of this invention provide a presentation that is custom tailored to each reader's needs. This makes the avatar system more flexible than video clips or other fixed multimedia presentations. Further, the avatar system provides the hypertext links in the document ordered into a meaningful position by the avatar, thus offering strategies for information navigation. Additionally, the extra information does not require the reader to leave the current page being viewed. The reader can continue to view the current page while being offered more information, both visually and audibly, by the avatar. Finally, when the avatar creator is also the document author, the avatar can add to the information available by providing context to the document's construction.

Each object in a document can be annotated with multiple avatars. The avatars can represent different people or different abstractions of the materials. For example, in a collaborative work, the different abstractions could be the viewpoints of the different authors. The avatars can also be used, for example, to give technical versus managerial viewpoints, or English versus Japanese delivery. Such perspectives augment the more usual mode of writing documents and offer a complimentary and more personalized narrative viewpoint of the materials presented.

An Avatar Studio allows the avatar creator to rapidly construct avatars that reflect the avatar creator's physical appearance by simply tracing over digital photographs, for example. Thus, the avatar can represent the likeness of a particular avatar creator to others by using the avatar creator's recorded voice, visual likeness, physical mannerisms and personality.

These and other features and advantages of this invention are described in or are apparent from the following detailed description of the preferred embodiments.

BRIEF DESCRIPTION OF THE DRAWINGS

The invention is described in detail with reference to the following drawings, wherein like numerals refer to like elements, and wherein:

FIG. 9 shows an example of an ASL file;

DETAILED DESCRIPTION OF PREFERRED EMBODIMENTS

Anthropomorphic interfaces allow an individual to use the metaphor of human face-to-face communications to provide, through a personal representative, information to a second individual when actual physical presentation is not possible or convenient. Given the appropriate sensory inputs, the personal representative engages in multi-modal, e.g., speech, text and animation, discourse with users to approximate face-to-face conversations between the individuals. This also includes the recognition and use of gestures, facial expressions and body postures, and the more traditional verbal channels provided by speech and natural language understanding and synthesis.

To be effective, a personal representative should be autonomous. That is, the personal representative must be able to operate independently of the individual it represents and must be able to convey information in a complex and dynamic environment. The range of behavior that the personal representative should possess includes providing information about the individual it represents, voicing the individual's opinions and personal preferences, relating and applying the individual's expertise in specific domains, relaying messages to or from the individual and making commitments on behalf of the individual.

A second factor that makes the personal representative effective is that the physical appearance and mannerisms of the personal representative closely approximate those of the individual it represents. That is, the facial rendering of the personal representative should conform as much as possible to that of the individual it represents. In addition, the individual's own personality should be reflected in the personal representative by displaying as closely as possible the range of expressions, for example, that the individual would display in actual face-to-face communications.

This last criteria can be closely satisfied by incorporating into a personal representative standard expressions that would ordinarily accompany face-to-face communications. For example, the personal representative could include quizzical looks such as raised eyebrows or could register dissatisfaction by frowning. Thus, the combination of these facial expressions, body motions and an accompanying script can be used by the represented individual to convey meaning in much the same way as would occur during face-to-face communications.

Figure 1:
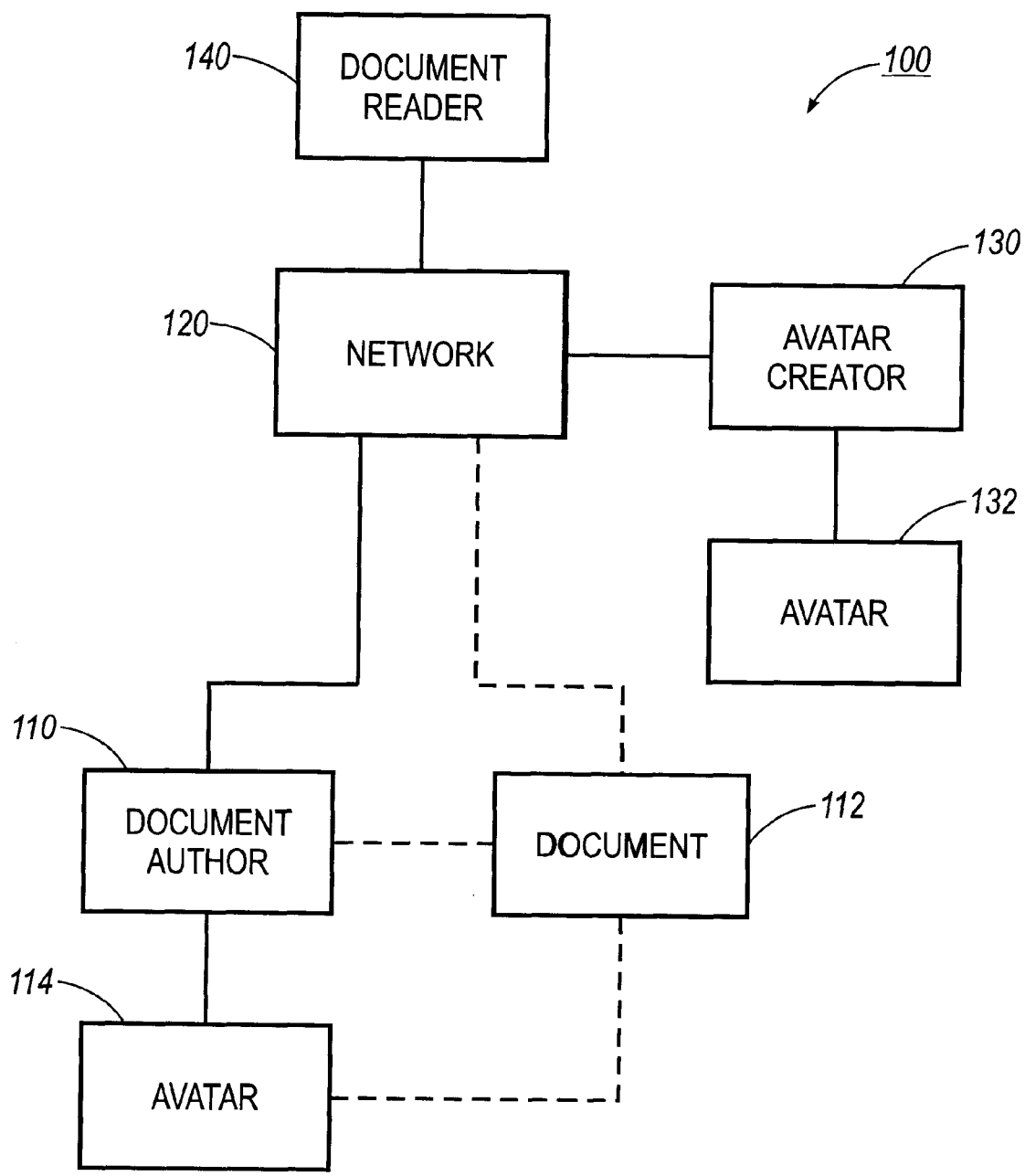
FIG. 1 schematically shows an exemplary avatar system.

FIG. 1 is a diagram of a personal representative, or avatar, system 100 according to an embodiment of the invention. A document author 110 creates a document 112 and stores the document 112 in an electronic format on a network 120. The network 120 can be any network capable of supporting multimedia communications, including, for example, the Internet. Alternately, the network 120 can be a local area network, an ethernet, or any backbone network capable of providing the bandwidth needed for the multimedia communication between the network and users of the network. An avatar creator 130 creates an avatar 132 and uses the avatar 132 to annotate the document 112. A document reader 140 reads the document 112 and interacts with the avatar 132 to gain additional information concerning the document 112, such as the opinion of the avatar creator 130 regarding the technical merits of the document 112.

When the network 120 is, for example, the Internet, the avatar creator 130 would first have to obtain write authority to attach the avatar 132 to the document 112, because the attachment of the avatar 112, i.e., creation of hypertext links, modifies the document 112. The document author 110 can provide this authority by setting up a "comments" page or by making a copy of the document. Alternately, the avatar creator 130 can, for example, send an e-mail to the document author 110, specifying where the hypertext links should be inserted.

In the above discussion, the avatar creator 130 is described as distinct from the document author 110. However, the document author 110 may also be an avatar creator. That is, the document author 110 may create a second avatar 114 and use the second avatar 114 to annotate the document 112.

In the discussion that follows, the avatar 114 or 132 is used to allow the document author 110 or the avatar creator 130 to annotate the electronic document 112 with that avatar creator's personal views. An exemplary electronic document is a web page. However, while web pages and other hypertext mark-up language (HTML) documents readily lend themselves to avatar attachment, the avatar of this invention can be attached to any electronic document, including electronic documents created by word processing programs.

Figure 2:
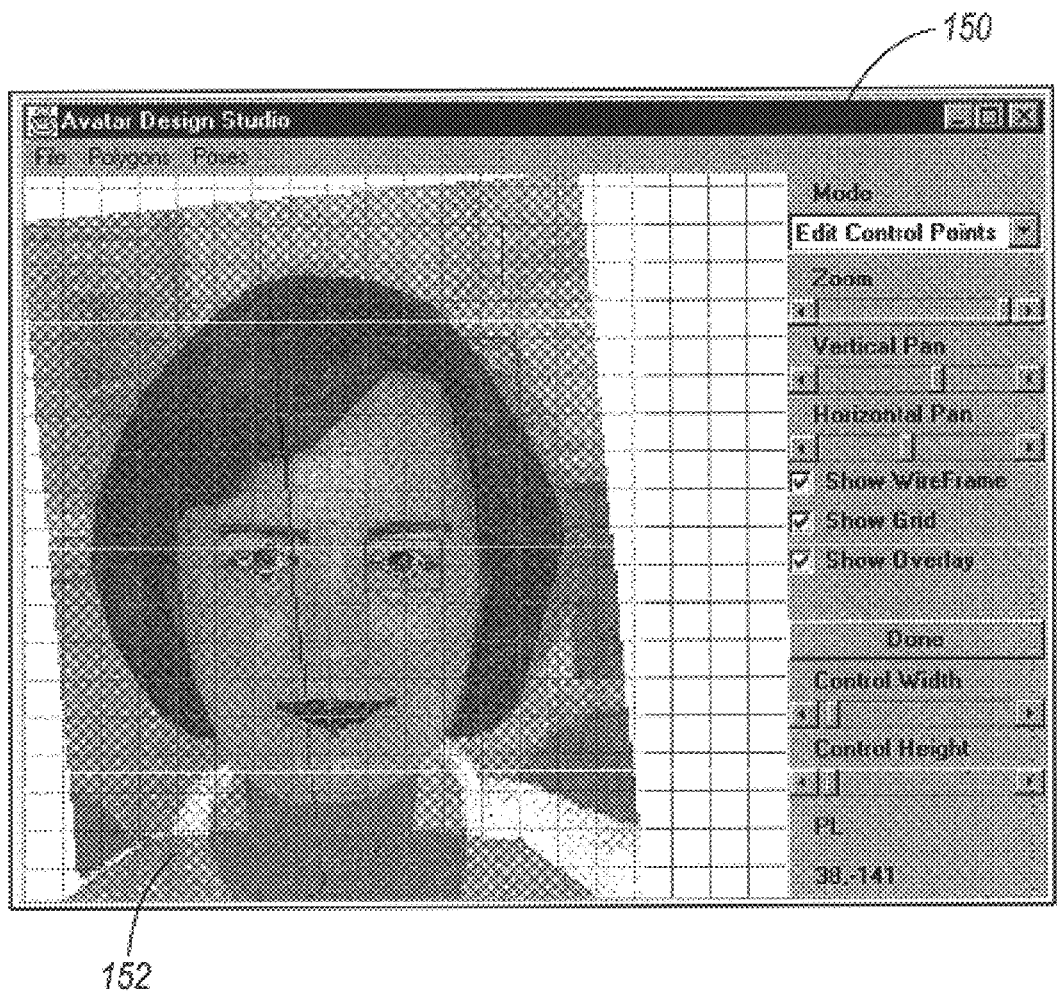
FIG. 2 shows an avatar constructed according to an embodiment of the invention.

FIG. 2 shows an avatar 152 created in accordance with this embodiment. As shown in FIG. 2, the avatar 152 may be rendered in a window 150 on a computer-driven display such as a CRT monitor. The avatar 152 shown in FIG. 2 includes a rendering of the head of the avatar creator. As shown in FIG. 2, the avatar 152 also closely approximates the actual appearance of its creator.

Avatars are created in two parts: avatar visual appearance and avatar behavior. The following describes the avatar creation process. In one example, the avatar is constructed using programs developed to interface with a JAVA™ run-time animation engine. The two primary tools used to define the avatar are Avatar Studio, a program that defines the visual look of the avatar and its range of motion, and Avatar Scripting Language, ASL, which defines the avatar's behavior. In this discussion, a two-dimensional avatar is described. Appendix A contains source code for Avatar Studio ASL.

The avatar constructed using Avatar Studio includes a set of control points that can move over time on linear trajectories relative to the avatar's location. As described below, moving the control points animates the avatar. A set of layered polygons form the visual appearance of the avatar. The polygons can be fixed to the avatar's frame of reference (static), fixed to a single control point to allow motion relative to the avatar's frame of reference (point polygons), or fixed to two or more control points (feature polygons). A feature polygon changes shape when one or more of the control points associated with that feature polygon move. Polygons can also be clipped inside other polygons (clipped). Thus, a polygon for a tongue can be clipped inside polygons for the avatar's mouth.

Avatar poses are defined as locations for one or more control points relative to the avatar's frame of reference. Animation is achieved at run-time by either commanding that the avatar assume a pose within time Δt, or by explicitly commanding control points to move to specified locations with time Δt. A complete avatar includes a head wire frame and a body wire frame. Each of the head and body wire frames has its own control points, polygons and poses. This allows the head to be moved as a unit independently of the body.

Figure 3:
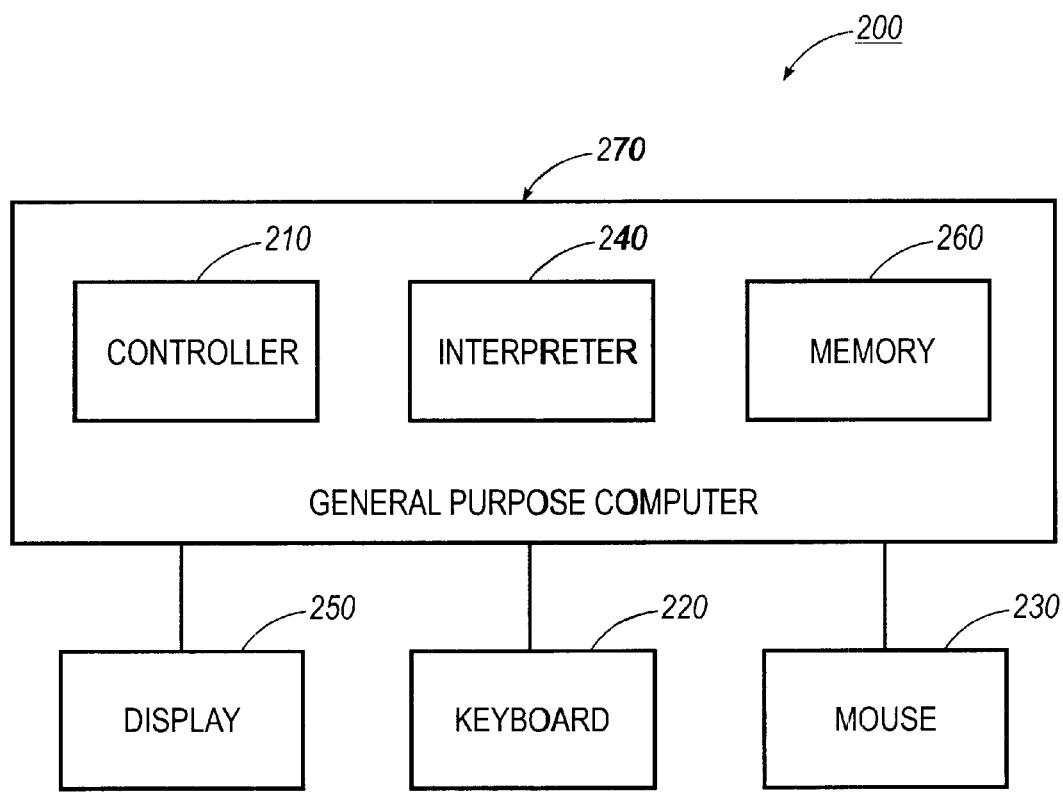
FIG. 3 schematically shows an exemplary apparatus for constructing the avatar.

FIG. 3 shows an avatar processor 200 according to one embodiment of the invention. A controller 210 controls processing of inputs from an avatar creator who wants to construct an avatar. The controller 210 receives inputs from the avatar creator via operator interfaces, such as a keyboard 220 or a mouse 230. An interpreter 240 translates between the JAVA™ code and the computer code necessary to create and display the avatar. The avatar's specification may be written into ASCII text files using the JAVA™ properties format, which can be loaded into later Avatar Studio sessions for editing or into JAVA™ applets for animation application. A display 250 allows the operator to see the avatar as it is being constructed. The display 250 also shows command options that the avatar creator can select using the keyboard 220 and/or the mouse 230.

A memory 260 typically includes random access memory (RAM) to temporarily store information, operative modules and hardware drivers/system files, which enable the controller 210 to control basic hardware functions (such as interpreting keyboard strokes), and portions of the operating system. The memory 260 typically also includes read only memory (ROM) to permanently store the computer's configuration and basic operating commands, such as additional portions of the operating system. Finally, the memory 260 includes at least one storage device such as a hard drive, a CD Rom and Drive and CD-ROM disks, a floppy drive and diskettes, flash memory, or the like, that contains permanent files of information, including the operative system modules and any avatars created using the controller 210. All components of the avatar Processor 200 communicate over a bidirectional system bus 270.

Figure 4:
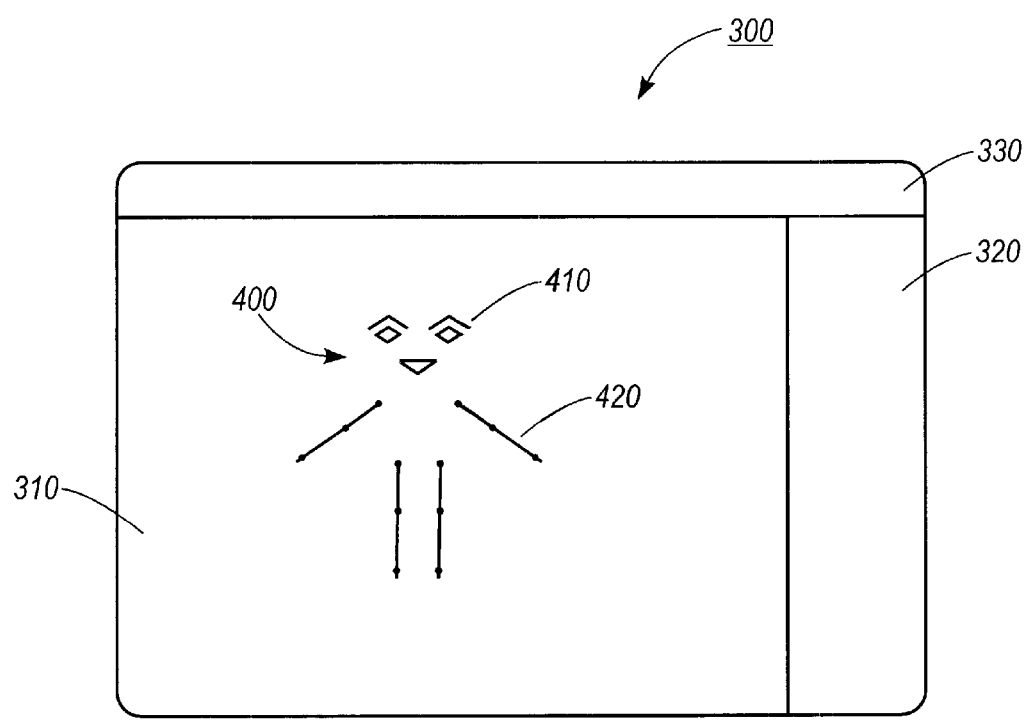
FIG. 4 shows an avatar construction main frame.

FIG. 4 shows a main application display 300 of the Avatar Studio displayed on the display 250 shown in FIG. 3. A display area 310 shows the avatar 400 under construction. A wire frame body 420 and a wire frame head 410 shown in the display area 310 comprise the control points of the avatar 400 that is to be created. A control panel 320 contains controls that are frequently used in constructing the avatar 400. Controls are accessed by the keyboard 220 or the mouse 230. A menu bar 330 contains menu items for creating a new avatar, opening a previously saved avatar or saving the current avatar to non-volatile memory, for example. The display 300 can be panned or zoomed to change the view of the avatar 400 to allow for detail work. To construct the avatar 400, the avatar creator may use freehand sketching. Alternately, a grid can be overlaid onto the wire frames 410 and 420 as a drawing guide. The location of the last mouse click can be persistently displayed at the bottom of the control panel, which helps compute exact placement of the control points for polygon vertices. Finally, a Graphics Interchange Format (GIF) image can be loaded, made semi-transparent and overlaid into the display area 310. Alternately, a Joint Photographic Experts Group (JPEG) image may be overlaid in the display area 310. Thus, an avatar creator using a GIF or JPEG digital image can place the digital image into the display area 310 over the wireframes 410 and 420 and simply trace over the digital image to produce the avatar 400.

Figure 5:
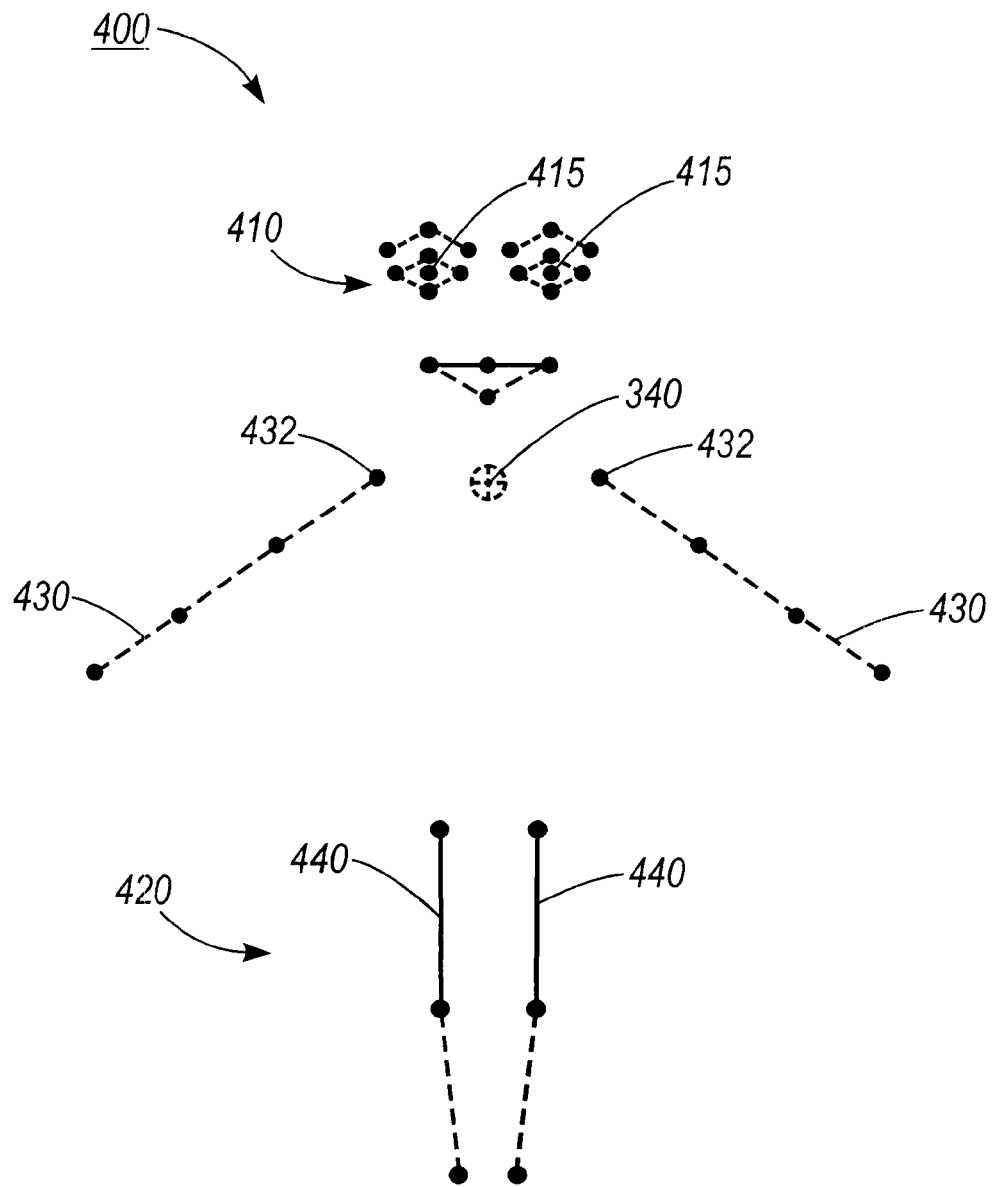
FIG. 5 shows an avatar wire image.

As noted above, a set of control points underlay the avatar 400 to drive the avatar's animation. FIG. 5 shows the avatar's wire frames 410 and 420 with the control points indicated as dots. The location of the control points are specified relative to an origin 422 of the avatar 400, which is located at a center of the neck of the avatar 400. Some control points are static and do not move, such as the shoulder control points 432. Other control points can move independently, such as the pupil control points 415. Other control points can be grouped into control segments such as arm segments 430 and leg segments 440.

Figure 6:
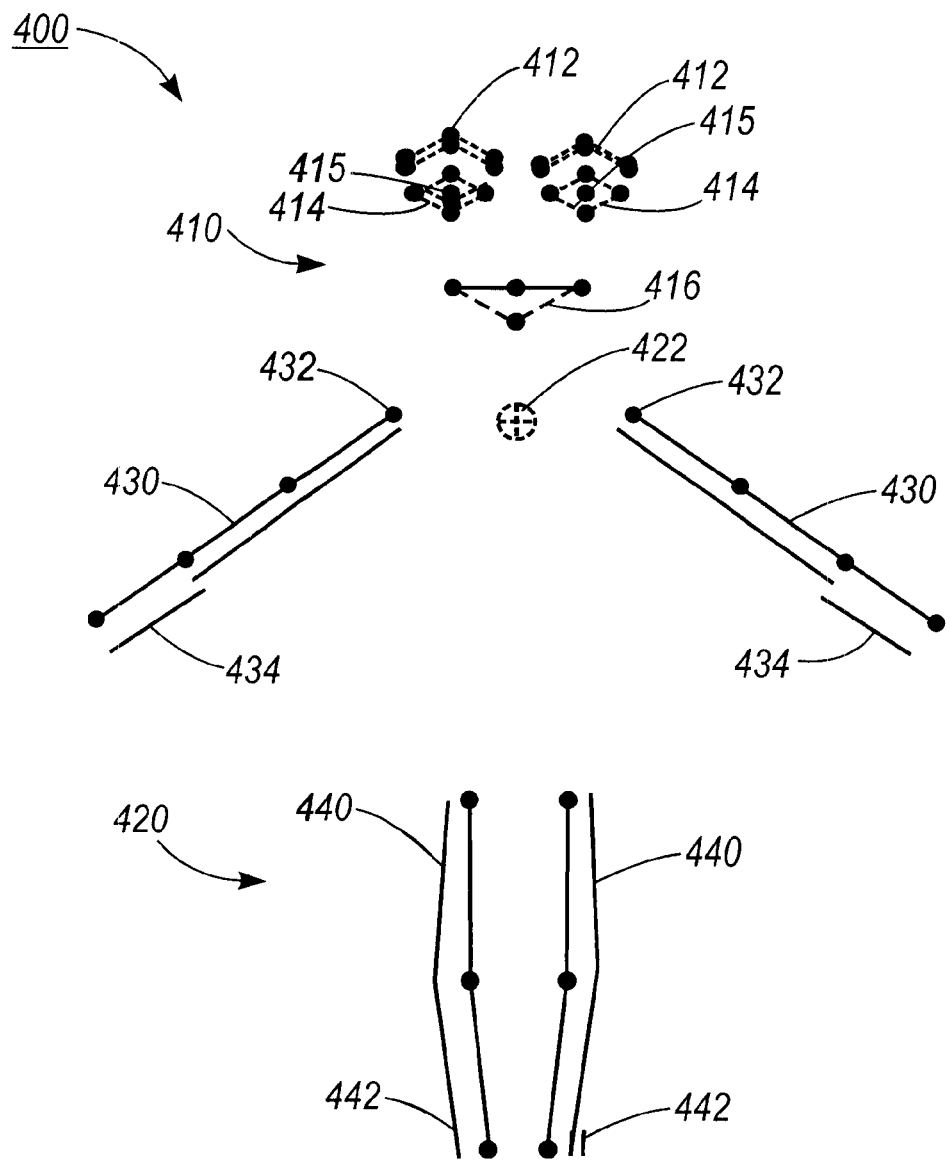
FIG. 6 shows an example of avatar control segments.

FIG. 6 shows an example of the avatar control segments. In FIG. 6, the eyebrow may be modeled with one or more feature polygons and bound to left brow and right brow control sets 412, respectively. The eye openings may be modeled with one or more feature polygons and bound to left eye and right eye control sets 414, respectively. The pupils may be modeled with one or more point polygons and bound to left pupil and right pupil control sets 415, respectively. A mouth opening may be modeled with one or more feature polygons and bound to a mouth control set 416. Arms may be modeled with one or more feature polygons and bound to the left arm and the right arm control sets 430, respectively. The hands may be modeled with one or more feature polygons and bound to hand left and hand right control sets 434, respectively. The legs may be modeled with one or more feature polygons and bound to the left leg and the right leg control sets 440, respectively. Finally, the feet may be modeled with one or more point polygons and bound to left foot and right foot control sets 442, respectively.

Figure 7:
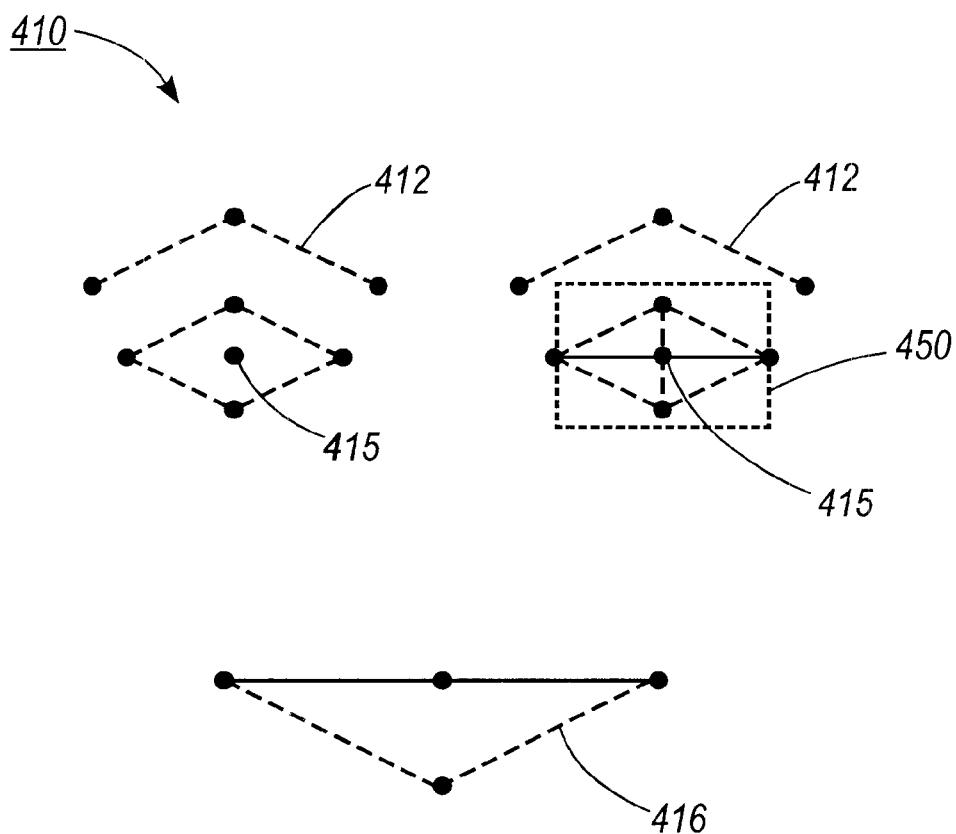
FIG. 7 shows editing a control point.

FIG. 7 shows the process of editing a control point. In FIG. 7, the wire frame image 410 of the face of the avatar 400 is shown, including the left and right pupil control points 415, the left and right eyebrow control points 412 and the mouth control point 416. To edit one of the control points of the wire frame image 410, that control point is highlighted by selecting it using the keyboard 220 or the mouse 230. A range-of-motion icon, such as the box 450, is displayed to indicate an allowed range of motion for the selected control point. The selected control point can then be moved to any location within the box 450. For example, if the right pupil control point 415 is selected and moved, the associated element, in this case, the right pupil, will change shape accordingly. Although the range of motion of the right pupil control point 415 is shown limited by the box 450, the size of the box 450, and thus the allowed horizontal or vertical range of the right pupil, may also be changed.

As noted above, polygons may be attached to the wire frames 410 and 420 to "flesh out" the avatar 400. Just as the control points can be edited, the polygons that make up the avatar 400 may also be edited. The polygons can be deleted, moved or have their vertices changes. In addition, other properties of the polygon, such as whether the polygon is filled, the color of the polygon and whether the polygon is clipped, can also be edited.

An avatar pose is defined by location specifications for one or more control points. Animation is achieved at runtime by commanding the avatar 400 to assume one or more avatar poses within a specified time period. New avatars 400 have an initial set of poses defined for them. These poses can be modified and new poses can be added. To view a pose, the avatar creator can select a pose from a poses menu. Once a pose is selected, the avatar 400 may animate the pose over a specified number of time steps.

The Avatar Scripting Language (ASL) is a high-level scripting language that describes the avatars' behavior, including the commands that cause animation of the avatar. The ASL allows the avatar creator to create a script that can be attached to an electronic document. The script is executed when designated text or image anchors in the document are activated. In one embodiment, the ASL files are ASCII text files. The ASL file includes one avatar statement followed by zero or more script definitions. Each script definition defines a named behavior, which may include a set of sub-behaviors and/or primitive commands. Each primitive command has an explicitly-stated start time relative to the start of the script and an explicit duration or stop time. Primitive commands exist, for example, for performing pre-defined poses, moving, scaling, i.e., changing size, and playing pre-recorded audio files. Thus, an avatar can "talk" using the avatar creator's pre-recorded voice, can make facial expressions and gestures, and can pose. All these activities can be performed synchronously to produce a narrative about an object.

Figure 8:
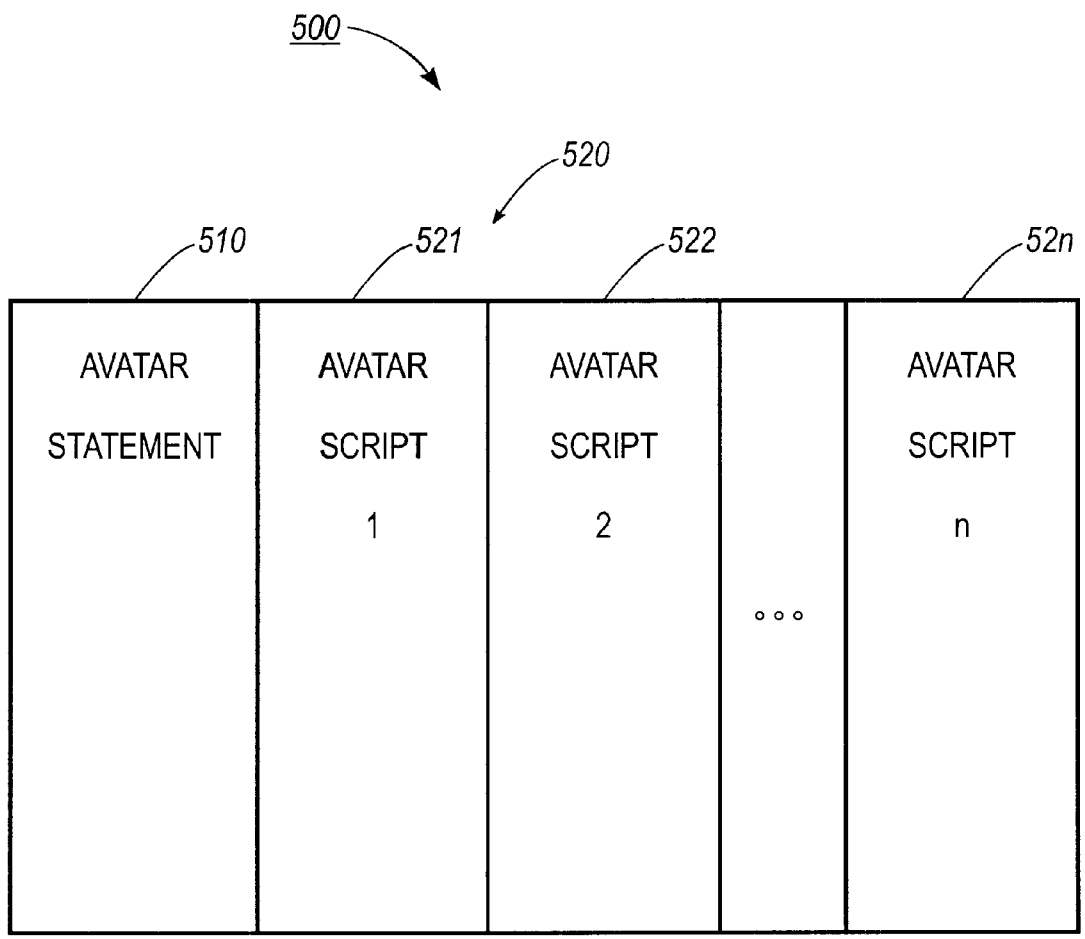
FIG. 8 is a logical representation of an avatar statement.

FIG. 8 is a logical representation of an avatar ASL file 500. An avatar statement 510 specifies a symbolic name for an avatar, an identifier, followed by the path name to the avatar definition file. The avatar script file 520 includes avatar scripts 521–52m. The avatar scripts 521 and 522 contain specific commands such as, for example, "pose:f-pose.right arm up" and "pose:fpose.right arm down".

FIG. 9 shows an example of an ASL file 500 for an avatar "Tim" that directs the avatar "Tim" to wave its right arm and say "hello". The avatar statement 510 identifies the avatar as "Tim" and specifies the path name "tim.avt" as the avatar definition file for the avatar "Tim". The ASL file 500 includes a script file 520 having a single script 521. The single script 521 is named "hello", and, when executed, causes the avatar "Tim" to raise its right arm, say hello and lower its right arm. The script "hello" 521 includes the commands and time sequences necessary to execute these actions. The ASL file 500 also includes an "endscript" command, which terminates the action called for in the "hello" script 521. As shown in FIG. 9, when the "hello" script 521 is executed, the avatar "Tim" performs the action "right arm up" starting at script time 1 for 5 time intervals. The audio "hello" is played starting at time 1 until it ends, and the command "right arm down" begins at script time 20 and takes 5 time intervals to complete.

A number of script primitives can be used within the script definitions. The primitive "RUNSCRIPT <identifier>" executes the main script. If a duration is specified, the script will be run for exactly the specified duration, terminating early or repeating as necessary. Otherwise, the script is run until all of its script definitions have been executed. The primitive "POSE <identifier>" causes the avatar to assume the specified pose, which must be defined in the avatar's definition file. If a duration is specified, the motion is linearized over the specified time interval. Otherwise, the motion is instantaneous. The primitive "CONTROL <identifier> <integer> <integer>" causes the specified avatar control point to be moved to the specified x,y coordinates in the avatar's frame of reference. If a duration is specified, the motion is linearized over the specified time interval. Otherwise, the motion is instantaneous.

The primitive "HEAD <real> <real>" moves the avatar's head relative to its body. The first <real> argument controls rotation about the horizontal axis, to generate a nod. The second <real> argument controls rotation about the vertical axis, to generate a turn. If a duration is specified, the motion is linearized over the specified time interval. Otherwise the motion is instantaneous. The primitive "MOVE <real> <real>" moves the avatar on the page to the coordinates specified in a normalized coordinate system in which 0.0, 0.0 represents the upper left-hand corner of the display and 1.0, 1.0 represents the lower right-hand corner of the display. If a duration is specified, the motion is linearized over the specified time interval. Otherwise the motion is instantaneous.

The primitive "SCALE <real> <real>" changes the size of the avatar in the x and y dimensions. Values of 1.0, 1.0 make the avatar as large as possible, while values of 0.0, 0.0 make the avatar appear the size of the pixel. If a duration is specified, the expansion or contraction of the avatar from its current size is linearized over the specified time interval. Otherwise, the motion is instantaneous.

The primitive "AUDIO <identifier>" plays a specified audio file. The file must exist in the same directory as the avatar's ASL file. Duration is ignored. The primitive "<variable>=RANDOM <integer> <integer>" assigns a random number to the variable, where the number will be inclusive between the two numbers specified. Duration is ignored. The primitive "SELECT <identifier>" randomly selects an identifier and executes the script associated with the identifier.

Three other primitives allow the avatar to simulate mouse clicks on document objects, thus enabling the avatar to give a guided tour through a series of hypertext linked objects. These primitives all reference a named object on the document. For example, in HTML, the referenced name is that defined in the standard name property of the "A tag". The primitive "MOVE_TOWARDS object" causes the avatar to move into the vicinity of the object on the page, so that it can reach the object with a hand through performance of a predefined pose. The primitive "POINT_TOWARDS object" cause the avatar to perform one of its predefined poses so that at completion, the avatar's hand is on or points towards the specified object. Finally, the primitive "CLICK object" performs the same actions as if a document reader had clicked on the specified object with the mouse. Execution of the "CLICK object" primitive may be accompanied by an audible click sound.

In addition to avatar creator-defined scripts, certain scripts may be called in response to pre-defined reader actions. For example, the script "INTRO", when enabled, is invoked the first time an avatar is selected by the reader, for example, by clicking it on with the mouse. In response, the avatar responds with a simple greeting such as, for example, "hi". The script "SELECTED" is invoked, when enabled, when the reader drags the avatar from a docked position onto the document. The avatar may respond with a pose indicating a look of interest. The "DRAG_HANDLE" script is invoked, when enabled, when the reader drags the avatar over a part of the document that contains an avatar link. Finally, the "DRAG_NOHANDLE" script is invoked, when enabled, when the reader drags the avatar over a part of the document that does not contain an avatar link for the avatar.

From the above-outlined description, it is obvious that the avatar is invoked when a link to the avatar is activated. In HTML, links to particular locations in a document, or between locations in the same document, are made possible through the NAME attribute of the "A" anchor element. The "A" anchor element marks a block of the document as a hypertext link. The block can be text, highlighted text, or an image. The "A" anchor element can take several attributes. At least one attribute must be either "HREF" or "NAME". "HREF" specifies the destination of the hypertext link, while "NAME" indicates that the marked text can itself be the destination of a hypertext link. If both attributes are present, the anchor is the beginning of one link and end of another link. The NAME attribute allows the avatar creator to assign a unique name, called a fragment identifier, to a particular place in a document. The avatar creator can then link this particular name location using a special form of URL that contains the name. The link can be made within the same document, or from any other document.

The avatar system takes advantage of this feature of HTML. Once created, the avatar ASL script files and avatar definition files can be linked to an electronic document, for example, to provide additional details, to express opinions, and/or to navigate a reader through the electronic document. In an exemplary embodiment, the avatar script and definition files are used in conjunction with a hypertext document rendering system, such as an HTML web browser, which supports annotating objects on a page of the electronic document. The objects include words, sentences, paragraphs and figures. The objects are annotated with hypertext links, symbolic names and other properties. Avatar links are highlighted in a color different from that used to highlight regular hypertext links. For example, if regular hypertext links are displayed in blue, the avatar links may be displayed in red. Avatars are attached to the electronic document by specifying a special avatar reference property associated with the page object.

In HTML, this is accomplished by adding an "AREF" attribute to the HTML "A" tag. AREF specifies an avatar description file and a script file. For example, the tag:

<A AREF="tim.asl"# ok1> . . . </A> wrapped around a paragraph in an HTML page specifies that the behavior "ok1" for the avatar defined in "tim.asl" is to be associated with the paragraph. This mechanism may be used to associate comments or narratives about the annotated object by the person represented by the specified avatar.

Figure 10:
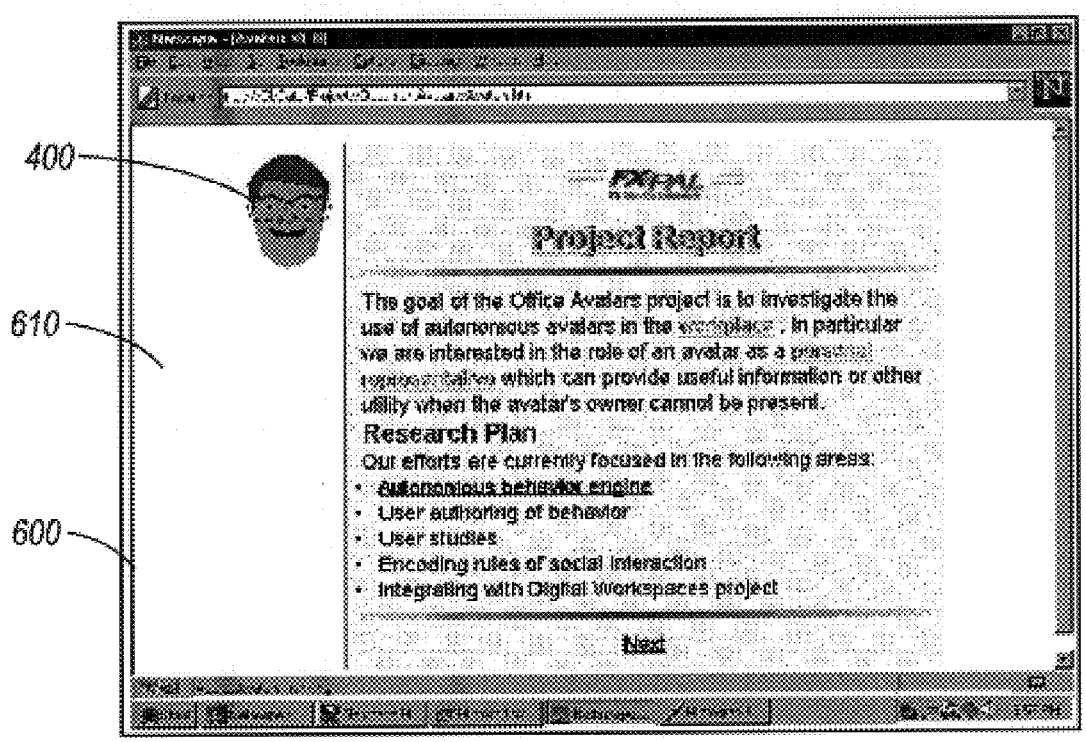
FIG. 10 shows an avatar docked in a HTML document.

As shown in FIG. 10, when a document is viewed, all avatars associated with the current page are loaded and are displayed "docked" in the margin of the document. FIG. 10 is an example of an HTML page 600 including the attached avatar 132 docked in the left hand margin 610 of the page. In FIG. 10, only the head 410 of the avatar 132 is displayed while the avatar 132 is docked. This allows multiple avatars to be displayed on the page 600.

Figure 11:
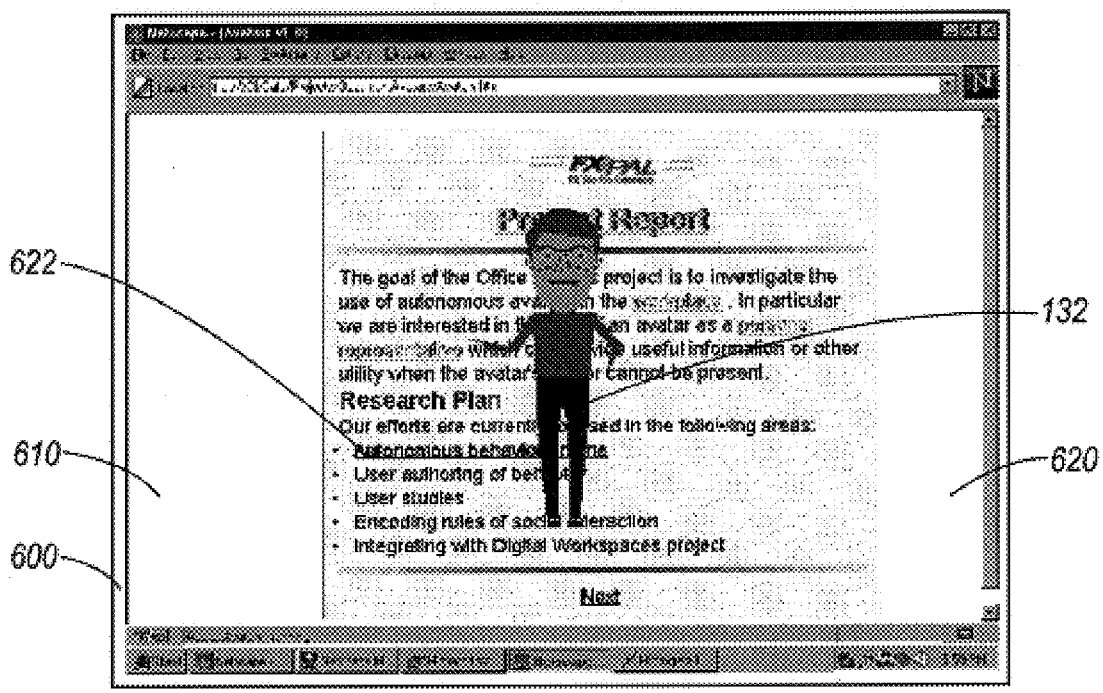
FIG. 11 is an example of an avatar attached to a HTML document.

FIG. 11 is an example of the avatar 132, which is attached to the HTML document 600, such as the document 112, performing a specified behavior of pointing to an object. In this case, the object is a portion 622 of the text 620 of the page 600. In FIG. 11, the avatar 132 is performing the specified behavior because a reader has called forth the avatar 132 either by dragging the avatar 132 over the portion 622 or selecting the portion 622 with the keyboard 220 and/or the mouse 230.

Figure 12:
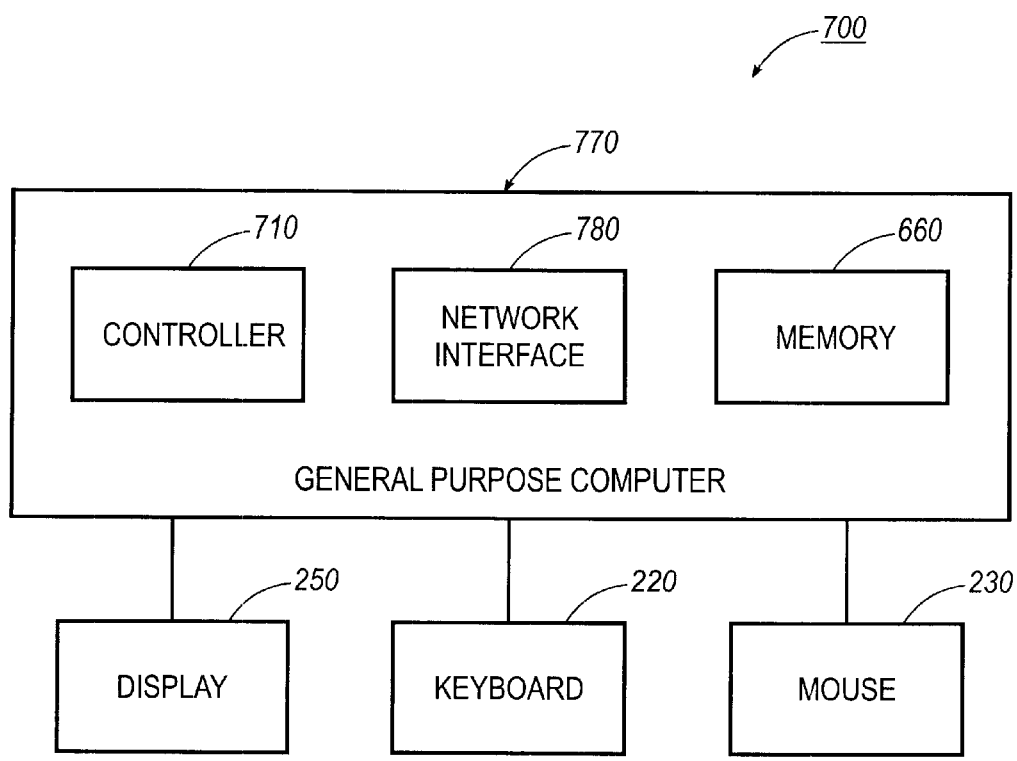
FIG. 12 is a block diagram of an apparatus for reading documents annotated with the avatars.

Referring back to FIG. 1, the document reader 140 can access the network 120 to review the document 112. If the avatar 132 is attached to the document 112, the avatar 132 may be displayed to the document reader 140. FIG. 12 is an exemplary block diagram of a system 700 used by the document reader 140 to review the document 112 and to interact with the attached avatar 132. In FIG. 12, a controller 710 accesses the network 120 via a network interface 780, which may be, for example, a modem. A memory 750 includes random access memory (RAM) for temporary storage of information, operative modules and hardware drivers/system files, which enable the controller 710 to control basic hardware functions, such as interpreting keyboard strokes from the keyboard 220, and portions of the operating system. The memory 750 also includes read only memory (ROM) for permanent storage of the computer's configuration and basic operating commands, such as additional portions of the operating system, and video RAM for storing image files. Finally, the memory includes at least one storage device that contains permanent information files, including the operative system modules.

In particular, the memory 750 contains an avatar animation engine, which may be a set of JAVA™ classes that can easily be integrated into applets or standalone JAVA™ applications. The primary class that an application needs to interface with encapsulates the run-time environment needed for avatar animation. When the controller 710 accesses the document 112 from the network 120, an image of a page of the document 112 is stored in the video RAM of the memory 750 and displayed on the display 250. If the document 112 is modified to contain avatar links, the displayed page shows the avatar links in a color distinct from the normal hypertext links, and also displays the avatar 132 docked in a margin of the page. The controller 710 receives commands from the document reader 140 via the keyboard 220 and/or the mouse 230. All the components of the apparatus communicate via a two-way bus 770.

In operation, a new avatar context is created and all the required avatar definition and script files are loaded. When the document reader 140 clicks on an avatar link, the first behavior/avatar pair associated with the link is performed. If necessary, the avatar 132 is removed from its docked position to the general location of the annotated object, and the avatar head 410, and possibly the avatar body 420, is rendered, prior to the performance beginning. If the document reader 140 clicks on a docked avatar 132, it may perform an INTRO behavior, e.g., an introduction or greeting. If the document reader 140 drags the avatar 132 from the margin onto the document 112, the avatar 132 may perform a selected behavior, if defined, e.g., an expression of interest. If the document reader 140 drags the avatar 132 over a document object for which the avatar 132 has a defined behavior defined, the avatar 132 performs a DRAG_HANDLE behavior if that behavior has been defined. Such a behavior can be, for example, a "happy" expression. Finally, if the document reader 140 drags the avatar over a part of the document for which the avatar 132 does not have any defined behaviors, the avatar 132 may perform a DRAG_NOHANDLE behavior, if this behavior has been defined. Such behavior can be, for example, a "sad" or a "neutral" expression. In addition, if the document reader 140 drags the avatar 132 over a document object for which the avatar 132 has a defined behavior, and the document reader 140 drags the avatar 132 onto that object, the avatar 132 will perform the associated behavior. If the avatar 132 is left on the document 112 after completing the behavior, the document rendering engine may periodically cause the avatar 132 to perform an idle behavior, if such a behavior has been defined.

Figure 13:
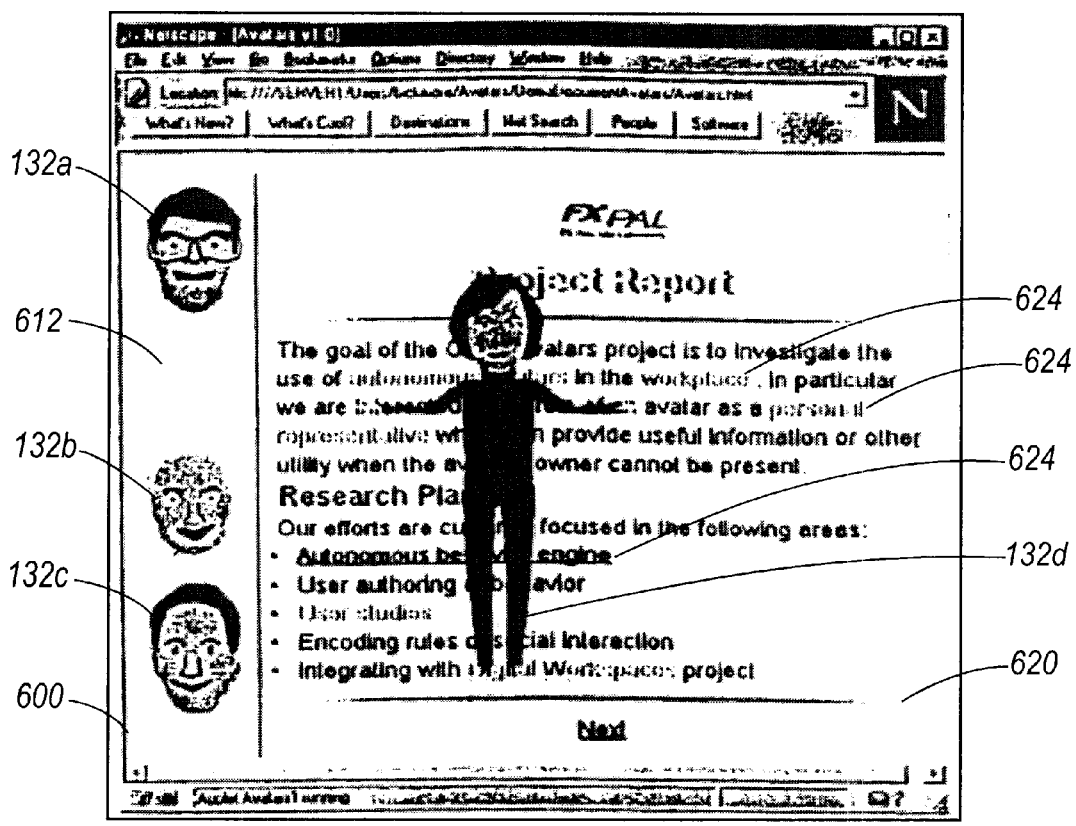
FIG. 13 is a flowchart outlining a method for loading a document annotated with avatars.

FIG. 13 shows multiple avatars 132a–132c docked in the margin 612 and another avatar 132d positioned over the text 620 of the HTML page 600. The HTML page 600 contains links 624 that may cause one or more of the avatars 132a–132c to activate and perform a specified behavior. In FIG. 13, the avatar 132d is shown placed over an object 622 of the HTML page 600. If more than one avatar is associated with a specific link, the first avatar specified in the AREF will move to the link, will have its head 410, and possibly its body 420, rendered, and will perform the specified behavior. The reader 140 may then move that first avatar back to the margin before the second avatar moves to the link and performs the specified behavior.

Figure 14:
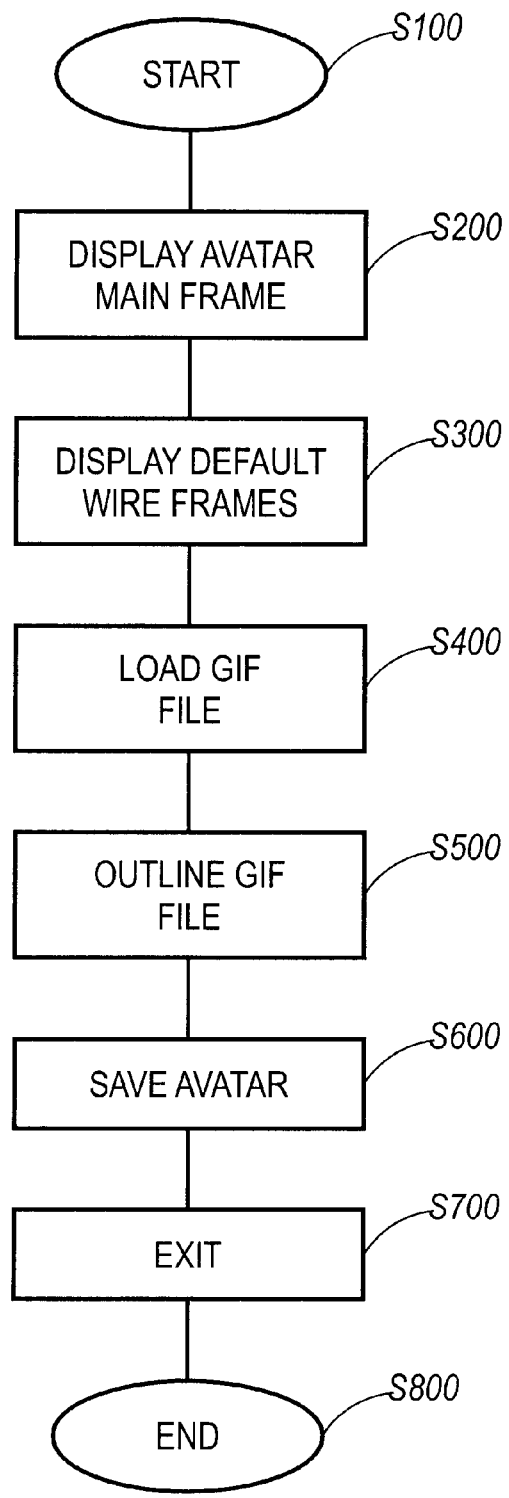
FIG. 14 shows multiple avatars docked in a HTML document.

FIG. 14 is a flowchart outlining one preferred method for constructing an avatar 132. Beginning in step S100, the control routine continues to step S200. In step S200, an avatar construction main frame is displayed to the avatar creator 130. Then, in step S300, a default wire frame with no polygons is displayed on the main frame and any existing avatars are deleted from the main frame. Next, in step S400, a GIF file containing a digital image of the avatar creator 130 is displayed on the main frame. Control then continues to step S500.

In step S500, the avatar creator 130 traces the outline of the GIF file to create the avatar 132. Then in step S600, the avatar 132 is saved to permanent memory in an avatar file. Next, in step S700, the control routine terminates the avatar construction process, and continues to step S800, where the control routine ends. The avatar file created during the avatar construction outlined above will thus contain the default characteristics of the polygons, control points and behavior. However, the avatar 132 can be further modified by specifying polygons, change control points and moving control points to provide the animation and specific behaviors outlined above with respect to FIGS. 5–11 and 13.

Figure 15:
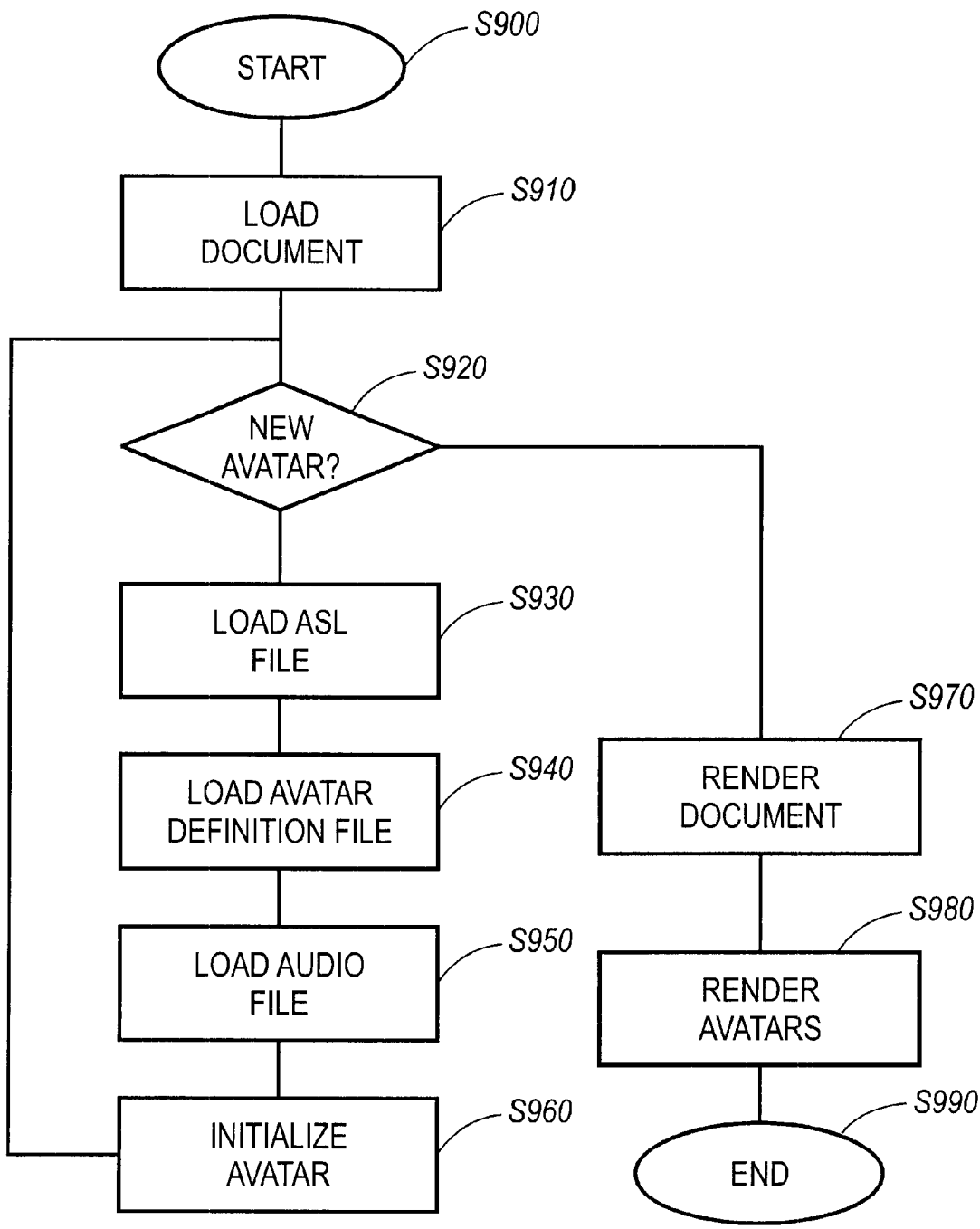
FIG. 15 is a flowchart outlining one method for constructing an avatar.

FIG. 15 is a flowchart outlining one preferred method for loading a document annotated with avatars. Beginning in step S900, the control routine continues to step S910. In step S910, an electronic document is downloaded from the network 120 to the system 700 using a network browser or rendering engine. Then, in step S920, the system 700 determines if the document contains any new avatars that have not previously been rendered with the document. If the document does not include any new avatars, the control routine jumps to step S970. Otherwise, the control routine continues to step S930.

In step S930, the system 700 loads the ASL file for the new avatar from the network 120. Then, in step S940, the system 700 loads the avatar definition file from the network 120. Next, in step S950, the system 700 loads any audio file associated with the avatar and the document. Then, in step S960, the system 700 initializes the avatar by creating a data structure to represent the avatar. Control then returns to step S920.

In step S970, the system 700 renders the document, displaying it on a display of the system 700. Then, in step S980, the system 700 renders the avatars. The result is similar to the document shown in FIG. 10. The control routine for loading a document annotated with avatars then continues to step S990, where the process ends.

As shown in FIGS. 3 and 12, the avatar processor 200 and/or the system 700 are preferably implemented on a programmed general purpose computer. However, the avatar processor 200 and/or the system 700 can also be implemented on a special purpose computer, a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA or PAL, or the like. In general, any device, capable of implementing a finite state machine capable of implementing the flowcharts shown in FIGS. 14 and 15 and the animation and behaviors outlined above with respect to FIGS. 5–11 and 13, can be used to implement the avatar processor 200 and/or the system 700.

As shown in FIGS. 3 and 12, the RAM portion of the memory 260 and 760 is preferably implemented using static or dynamic RAM. However, the RAM portion can also be implemented using a floppy disk and disk drive, a writable optical disk and disk drive, a hard drive, flash memory or the like. Similarly, the ROM portion of the memory 260 and 760 is preferably implemented using a ROM. However, the ROM portion can also be implemented using a PROM, an EPROM, or a CD-ROM and disk drive or the like. Further, it should be appreciated that the network interface 780 connecting the network 120 to the controller 710 can be a wired or wireless link. The network 120 can be a local area network, a wide area network, an intranet, the Internet, or any other distributed processing and storage network.

It should also be appreciated that the avatar processor 200 and the system 700 can be the same system, executing different control routines to provide the different functions of avatar creation and document reading.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

What is claimed is:

1. A method for interactively creating an avatar, comprising:
   receiving an input from a user defining an avatar reference point;
   creating a head and a body of the avatar, the head and the body being independent, the head and the body tied to the avatar reference point;
   receiving at least one input from a user defining a plurality of control points for each of the head of the avatar and the body of the avatar;
   receiving at least one input from a user defining a plurality of polygons, each polygon associated with a physical feature of one of the head and the body of the avatar;
   receiving at least one input from a user associating each polygon with at least one of the plurality of control points of one of the head of the avatar and the body of the avatar; and
   associating, for each of at least one of the plurality of polygons, a range of motion indicator with that polygon.

2. The method of claim 1, wherein at least one of the head of the avatar and the body of the avatar represents a likeness of a person, and includes at least one of the person's recorded voice, visual likeness, physical mannerisms and personality.

3. The method of claim 2, wherein the visual likeness is created by tracing an image of the person.

4. The method of claim 2, wherein the physical mannerisms include facial expressions and gestures.

5. The method of claim 1, further comprising:
   defining at least one avatar behavior; and
   associating the at least one avatar behavior with the avatar.

6. The method of claim 5, wherein defining the at least one avatar behavior includes creating at least one animation sequence for the avatar.

7. The method of claim 6, wherein the at least animation sequence includes changing facial expressions, making gestures, changing poses and idling.

8. The method of claim 7, wherein the facial expressions include moving pupils, raising eyebrows and opening a mouth.

9. The method of claim 8, wherein opening the mouth is synchronized with a recorded utterance.

10. The method of claim 7, wherein the gestures include pointing, shrugging shoulders, waving hands, and scratching.

11. The method of claim 7, wherein the poses include standing, walking and crouching.

12. The method of claim 7, wherein, for each at least one animation sequence, that animation sequence is performed by the avatar over a specified time duration.

13. The method of claim 5, wherein defining at least one avatar behavior comprises:
   defining a change of location of at least one of the avatar reference point and at least one control point relative to the avatar reference point; and
   defining a duration over which the change of location of the at least one of the avatar reference point and the at least one control point occurs.

14. An avatar, comprising:
   an avatar description, comprising:
      a n avatar reference point,
      a head and a body of the avatar, the head and the body being independent, the head and the body tied to the avatar reference point,
      a plurality of control points for each of the head of the avatar and the body of the avatar;
      a plurality of polygons, each polygon associated with at least one of the plurality of control points of one of the head of the avatar and the body of the avatar; and
      for at least some of the plurality of polygons, a range of motion indicator associated with that polygon; and
   at least one avatar behavior; wherein:
      each avatar behavior is associated with the avatar description;
      the avatar description represents the likeness of a person, including at least one of the person's recorded voice, visual likeness, visual mannerisms and personality; and
      the at least one avatar behavior includes at least one animation sequence for the avatar.

15. The avatar of claim 14, wherein each animation sequence includes at least one of changing facial expressions, making gestures and assuming poses.

16. The avatar of claim 14, wherein the physical mannerisms are coordinated with the recorded voice.

17. The avatar of claim 14, wherein the at least one avatar behavior includes activating at least one hypertext link in a document, the activation allowing the avatar to navigate a user through the document.

18. A method for interactively creating an avatar, comprising:
   receiving an input from a user defining an avatar reference point;
   creating a head and a body of the avatar, the head and the body being independent, the head and the body tied to the avatar reference point;
   receiving at least one input from a user defining a plurality of control points for each of the head of the avatar and the body of the avatar;
   receiving at least one input from a user defining a plurality of polygons, each polygon associated with a physical feature of one of the head and the body of the avatar;
   receiving at least one input from a user associating each polygon with at least one of the plurality of control points of one of the head of the avatar and the body of the avatar; and
   associating and selectively displaying, for each of at least one of the plurality of polygons, a range of motion indicator with that polygon in which the shape of the polygon is modifiable by the motion of the control point.

19. An avatar, comprising:
   an avatar description, comprising:
      an avatar reference point,
      a head and a body of the avatar, the head and the body being independent, the head and the body tied to the avatar reference point,
      a plurality of control points for each of the head of the avatar and the body of the avatar;
      a plurality of polygons, each polygon associated with at least one of the plurality of control points of one of the head of the avatar and the body of the avatar and modifiable by the motion of the control point; and
      for at least some of the plurality of polygons, a range of motion indicator associated with that polygon;
   selectively displaying the range of motion indicator associated with that polygon; and
   the polygon is modifiable by the motion of the control point;
   at least one avatar behavior; wherein:
      each avatar behavior is associated with the avatar description;
      the avatar description represents the likeness of a person, including at least one of the person's recorded voice, visual likeness, visual mannerisms and personality; and
      the at least one avatar behavior includes at least one animation sequence for the avatar.

* * * * *